(12) United States Patent
Abad et al.

(10) Patent No.: US 8,993,050 B2
(45) Date of Patent: Mar. 31, 2015

(54) METHOD FOR MANUFACTURING AND HANDLING ELASTOMER THERMOPLASTIC GELS

(75) Inventors: Vincent Abad, Chamalieres (FR); Jean-Marie Mus, Marsat (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 805 days.

(21) Appl. No.: 13/256,212

(22) PCT Filed: Mar. 8, 2010

(86) PCT No.: PCT/EP2010/052896
§ 371 (c)(1),
(2), (4) Date: Feb. 27, 2012

(87) PCT Pub. No.: WO2010/102973
PCT Pub. Date: Sep. 16, 2010

(65) Prior Publication Data
US 2012/0142840 A1    Jun. 7, 2012

(30) Foreign Application Priority Data
Mar. 11, 2009  (FR) ...................................... 09 51514

(51) Int. Cl.
*B05D 7/00* (2006.01)
*B27B 17/00* (2006.01)
(Continued)

(52) U.S. Cl.
CPC .............. *B29B 9/12* (2013.01); *B29B 2009/163* (2013.01); *B29C 47/00* (2013.01); *B29C 47/0011* (2013.01);
(Continued)

(58) Field of Classification Search
CPC ........... C08L 23/16; C08L 9/06; C08L 15/00; C08L 25/08; C08F 212/08; B29B 9/12; B29B 2009/163
USPC ........... 427/212; 524/399, 575, 578; 264/130, 264/131, 140–143, 211, 211.12, 211.13, 264/177.17
See application file for complete search history.

(56) References Cited

U.S. PATENT DOCUMENTS 4,359,492 A * 11/1982 Schlademan ................. 427/222
4,483,886 A    11/1984 Kowalski
(Continued)

FOREIGN PATENT DOCUMENTS

FR        2 340 358      9/1977
JP        2008-188802    8/2008

*Primary Examiner* — Timothy Meeks
*Assistant Examiner* — Ann Disarro
(74) *Attorney, Agent, or Firm* — Cozen O'Connor

(57) ABSTRACT

Method of manufacturing granulates or continuous strips intended for feeding an extrusion machine, formed of a gel comprising at least, as majority elastomer, a styrene thermoplastic elastomer and more than 200 phr of an extender oil, each element of the granulate having a given surface area. The granulate element is sized so that the compactness, of a granulate element, is less than a value decreasing from 1500 $m^{-1}$ to 375 $m^{-1}$ and deposited on the surface of said granulates is an anti-tack agent having a value increasing from 2 $cm^3$ to 8 $cm^3$ per $m^2$ of granulate surface area, when the mean size of the particles of said anti-tack agent increases from a value of 1 µm to 100 µm.

10 Claims, 1 Drawing Sheet

$C = 2*(r+l)/r*l$

(51) Int. Cl.
*B28B 11/06* (2006.01)
*D01D 5/40* (2006.01)
*B29B 9/06* (2006.01)
*D01F 1/02* (2006.01)
*B29C 47/88* (2006.01)
*B29C 47/00* (2006.01)
*B29B 9/12* (2006.01)
*B29B 9/16* (2006.01)
*B29C 47/10* (2006.01)
*B29K 9/06* (2006.01)
*B29K 21/00* (2006.01)
*B29K 105/00* (2006.01)

(52) U.S. Cl.
CPC ........... *B29C 47/0021* (2013.01); *B29C 47/003* (2013.01); *B29C 47/1054* (2013.01); *B29K 2009/06* (2013.01); *B29K 2021/00* (2013.01); *B29K 2105/251* (2013.01); *B29C 47/0004* (2013.01)
USPC ........... 427/212; 264/130; 264/131; 264/140; 264/141; 264/142; 264/143; 264/211; 264/211.12; 264/211.13; 264/177.17

(56) References Cited

U.S. PATENT DOCUMENTS

| | | | |
|---|---|---|---|
| 5,041,251 A * | 8/1991 | McCoskey et al. | 264/130 |
| 2002/0033131 A1 | 3/2002 | Bostrom et al. | |
| 2002/0049276 A1* | 4/2002 | Zwick | 524/476 |
| 2008/0110771 A1* | 5/2008 | Wang et al. | 206/83.5 |

* cited by examiner $C = 3/R$ $C = 2*(r+l)/r*l$

METHOD FOR MANUFACTURING AND HANDLING ELASTOMER THERMOPLASTIC GELS

RELATED APPLICATION

This is a U.S. National Phase Application under 35 USC 371 of International Application PCT/EP2010/052896, filed on Mar. 8, 2010.

This application claims the priority of French patent application no. 09/51514 filed Mar. 11, 2009, the entire content of which is hereby incorporated by reference.

FIELD OF THE INVENTION

The field of the invention relates to the manufacture and preparation of profiled elements produced using a thermoplastic elastomer gel.

BACKGROUND OF THE INVENTION

Thermoplastic elastomer gels are materials characterized by very low hardness, elastic behaviour, that is to say they regain their initial shape after a deformation, even a large-amplitude deformation, and a softening point above which they become plastic, which facilitates their processing.

Such gels may especially have, as a matrix, thermoplastic elastomers (TPE) and in particular styrene thermoplastic elastomers (known as TPSs), such as styrene/butadiene (SB), styrene/isoprene (SI), styrene/isobutylene (SIB), styrene/ethylene/propylene (SEP), styrene/ethylene/butylene (SEB) block copolymers, or else, styrene/butadiene/styrene (SBS), styrene/isoprene/styrene (SIS), styrene/butadiene/isoprene/styrene (SBIS), styrene/isobutylene/styrene (SIBS), styrene/ethylene/butylene/styrene (SEBS), styrene/ethylene/propylene/styrene (SEPS) and styrene/ethylene/ethylene/propylene/styrene (SEEPS) block copolymers, and blends of these copolymers.

In order to obtain a very low hardness, these gels also comprise a high proportion of extender oils. As a general rule, the extender oil is introduced into these gels in a proportion of 200 phr (per hundred of elastomer by weight) or more.

However, the storage, handling and preparation of these gels, with a view to the conversion thereof, presents specific difficulties. More particularly, the problem arises when it is desired to form small-sized granulates or pellets for feeding conventional means for converting thermoplastics.

It is known from the prior art to coat these products with anti-tack agents in order to prevent them from agglomerating during these industrial phases.

Conventionally, the anti-tack agents are chosen from finely divided materials such as silica, talc, mica, zinc oxide or zinc stearate. These agents may be used in the pure state or in the form of a mixture in which there is a majority proportion, of greater than 80%, of one of the above anti-tack agents.

The anti-tack agents may be deposited on the surface of the pellets or granulates of thermoplastic gels, by contacting with a powder, by spraying with a solution or by dip-coating in a liquid formed of a suspension having a high concentration of the anti-tack agent in question.

The problem faced by the use of anti-tack agents of any nature, lies in the fact that these products, when they are present above a certain proportion, substantially modify the properties of the thermoplastic gels such as, for example, the elastic modulus or the elongation capacity. Therefore, particular attention is needed when it is desired to deposit an anti-tack agent on the surface of these materials.

SUMMARY OF THE INVENTION

For this purpose, it has been demonstrated that the maximum amount of anti-tack agent deposited on the surface of a granulate or a pellet is substantially constant in volume for a given size of the particles forming the anti-tack agent. This volume per unit surface area represents the saturation volume.

It is also observed that the amount of anti-tack agent that it is necessary to deposit on the surface of a granulate or a pellet in order to obtain properties sufficient for the handling of these granulates or these pellets corresponds substantially to the saturation volume.

This maximum volume per unit surface area rises increasingly between 2 $cm^3$ and 8 $cm^3$ per $m^2$ when the size of the particles forming the anti-tack agent increases from 1 µm to 100 µm. The finer the powder is, the lower the volume needed to saturate the surface of the granulate or of the pellet.

The particle size may have an impact on the results given above, also, use will be made therefore of anti-tack agents that are in the form of powders, the particles of which have a mean size between 1 µm and 100 µm, and preferably between 1 µm and 50 µm, which corresponds to the particle size of the powders of the above type that are usually available commercially.

It is also observed that, when the amount of anti-tack agent is below the saturation volume, the granulates or pellets have a tendency to cake together with one another, forming agglomerates that it is difficult to separate.

Thus, the minimum amount of anti-tack agent to be deposited on the surface of the granulates and pellets to eliminate the tack of the granulates or pellets with respect to one another, corresponds substantially to the maximum amount that it is possible to fit on this surface.

The subject of the invention consists in taking advantage of these phenomena in order to dimension the minimum size and the shape of the granulates or pellets intended for feeding means for shaping the gel during manufacture.

Indeed, it has been considered that the amount, by volume, of anti-tack agent should not exceed a threshold set at 0.3% of the volume of gel, and consequently, of the mass of gel contained in a granulate or a pellet. A precise minimum dimensioning of the shape and size of the pellets or granulate elements results from this situation in order to respect the threshold in question.

By denoting by C the compactness of a granulate or a pellet, the compactness being expressed in $m^{-1}$ and being defined as the ratio between the surface area and the volume of said pellet or granulate, a maximum value of the compactness C, to be observed in order not to exceed the threshold value of 0.3% by volume of anti-tack agent present in a given volume of thermoplastic gel, is obtained.

The maximum value of the compactness decreases from a value of 1500 $m^{-1}$ when the size of the particles forming the anti-tack agent is minimal and about 1 µm, to a value of 375 $m^{-1}$ when the particle size is at its upper value of 100 µm expressing the geometric features of the pellet or of the granulate element in meters.

Figure 1:
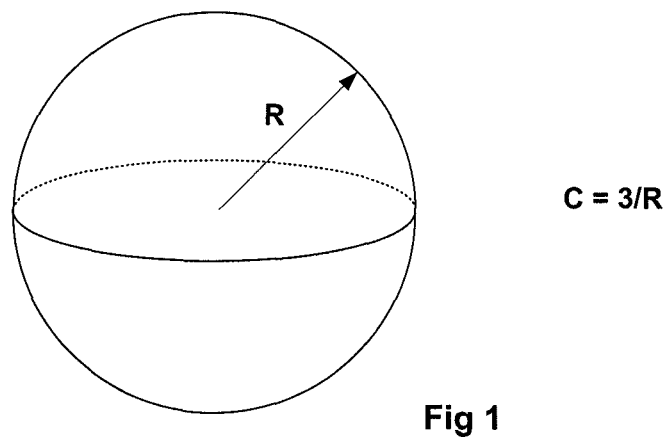
FIG. 1 depicts pellets or granulates having a spherical shape.

Thus, for pellets or granulates of spherical shape, as represented in FIG. 1, having a radius R, the compactness of which is equal to 3/R, the minimum value of the radius of the pellet or granulate will be 2 mm for an anti-tack agent comprising particles having a mean particle size of 1 µm, and 8 mm for an anti-tack agent comprising particles having a mean particle size of 100 µm.

Figure 2:
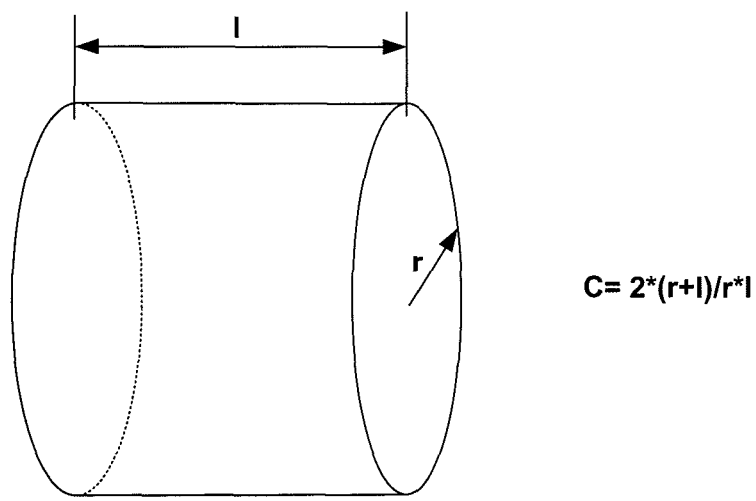
FIG. 2 depicts pellets or granulates having a substantially cylindrical shape.

More practically, it will be sought to produce pellets or granulates by cutting a continuous, substantially cylindrical cord of given diameter, so as to obtain pellets or granulate elements of substantially cylindrical shape having a length l and a radius r, as represented in FIG. 2, and for which the compactness $C=2(r+1)/r*l$.

Thus, for a cylindrical cord having a diameter of 2 cm, the minimum length of the pellets or granulates will be 0.15 cm for an anti-tack agent having particles with a mean size of 1 µm, and 1.15 cm when an anti-tack agent having particles with a mean size of 100 µm is used.

It will be observed that, for a cylindrical cord having a diameter of 1 cm, the minimum length of the pellets or granulates is 0.18 cm for an anti-tack agent having particles with a mean size of 1 µm. However, in this specific case, when an anti-tack agent having a large particle size is used, it is no longer possible to increase the length of the pellet or granulate in order to respect the maximum threshold of 0.3%. In the specific case of a cord having a diameter of 1 cm, it will then be advisable to choose an anti-tack agent having a particle size of less than 100 µm so as to increase the maximum value of the compactness C, in order to obtain a minimum length value of the length l that is below values that are too high. Thus, by reducing the size of the particles of anti-tack agent to 70 µm, a maximum value of the compactness of the order of 500 $m^{-1}$ is obtained, which makes it possible to obtain a minimum value of the length l of the pellets or granulates of 2 cm.

If it is desired to reduce the size of the granulate or pellet as much as possible, it is then advisable to use an anti-tack agent for which the particle size will be as low as possible. By way of example, for a particle size of the order of 1 µm, for which particles the maximum compactness is 1500 $m^{-1}$, cylindrical granulates or pellets having a diameter of 4 mm and a length l of 4 mm may be produced.

One application of the rules described above may also prove advantageous when the extrusion means is fed using a continuous, substantially cylindrical cord. In this case, the length of the cord may be considered to be infinite and the compactness C is then equal to 2/r. A minimum value of the radius r of 1.3 mm when the size of the anti-tack agent particles is on average 1 µm, and of 5.3 mm when the size of the anti-tack agent particles is on average 100 µm, results therefrom.

The granulate elements produced according to the method described above may be handled easily without forming agglomerates. They make it possible, inter alia, due to the optimization of their size, to feed the machines for manufacturing profiled elements in the form of granulates without introducing major modifications of the feeding of these machines in order to introduce the entering elements thereinto.

It will be observed that identical laws apply to the profiled element products resulting from these machines. When it is necessary to handle said profiled elements before the final handling thereof, the teachings of the present description will be applied so that the final product does not comprise, as a percentage of its weight, an excess of anti-tack agent likely to impair the properties thereof.

The invention claimed is:

1. A method of manufacturing granulates or pellets comprising forming granulates or pellets formed of an elastomer gel comprising a styrene thermoplastic elastomer and more than 200 per hundred of elastomer by weight of an extender oil, each granulate or pellet being dimensioned so that a compactness of each granulate or pellet is between 1500 $m^{-1}$ and 375 $m^{-1}$, and, depositing on a surface of each of said granulates or pellets, are particles of an anti-tack agent having a volume between 2 $cm^3$ and 8 $cm^3$ per $m^2$ of surface area of each granulate or pellet, a mean size of the particles of said anti-tack agent being between 1 µm and 100 µm.

2. The manufacturing method according to claim 1, wherein the mean size of the particles of said anti-tack agent is between 1 µm and 50 µm.

3. The manufacturing method according to claim 1, wherein the styrene thermoplastic elastomer is selected from the group consisting of:
 styrene/butadiene (SB),
 styrene/isoprene (SI),
 styrene/isobutylene (SIB),
 styrene/ethylene/propylene (SEP),
 styrene/ethylene/butylene (SEB),
 styrene/butadiene/styrene (SBS),
 styrene/isoprene/styrene (SIS),
 styrene/butadiene/isoprene/styrene (SBIS),
 styrene/isobutylene/styrene (SIBS),
 styrene/ethylene/butylene/styrene (SEBS),
 styrene/ethylene/propylene/styrene (SEPS),
 styrene/ethylene/ethylene/propylene/styrene (SEEPS),
 and blends of these copolymers.

4. The manufacturing method according to claim 1, wherein the anti-tack agent contains greater than 80% of silica, mica, talc or zinc stearate.

5. The manufacturing method according to claim 1, wherein each of the granulates or pellets has a substantially cylindrical shape.

6. The manufacturing method according to claim 5, wherein each of the granulates or pellets is obtained by cutting sections of a continuous cylindrically-shaped strip.

7. A method of manufacturing a continuous strip comprising forming the continuous strip formed of an elastomer gel comprising a styrene thermoplastic elastomer and more than 200 per hundred of elastomer by weight of an extender oil, the continuous strip being dimensioned so that the continuous strip has a compactness of between 1500 m and 375 m, and, depositing on a surface of the strip, are particles of an anti-tack agent having a volume between 2 $cm^3$ and 8 $cm^3$ per $m^2$ of surface area of the continuous strip, a mean size of the particles of said anti-tack agent being between 1 µm and 100 µm.

8. The manufacturing method according to claim 7, wherein the mean size of the particles of said anti-tack agent is between 1 µm and 50 µm.

9. The manufacturing method according to claim 7, wherein the styrene thermoplastic elastomer is selected from the group consisting of:
 styrene/butadiene (SB),
 styrene/isoprene (SI),
 styrene/isobutylene (SIB),
 styrene/ethylene/propylene (SEP),
 styrene/ethylene/butylene (SEB),
 styrene/butadiene/styrene (SBS),
 styrene/isoprene/styrene (SIS),
 styrene/butadiene/isoprene/styrene (SBIS),
 styrene/isobutylene/styrene (SIBS),
 styrene/ethylene/butylene/styrene (SEBS), styrene/ethylene/propylene/styrene (SEPS),
styrene/ethylene/ethylene/propylene/styrene (SEEPS),
and blends of these copolymers.

10. The manufacturing method according to claim 7, wherein the anti-tack agent contains greater than 80% of silica, mica, talc or zinc stearate.

* * * * *